United States Patent
Lee

(10) Patent No.: US 8,633,965 B2
(45) Date of Patent: Jan. 21, 2014

(54) IMAGE PHOTOGRAPHING DEVICE AND CONTROL METHOD THEREOF

(71) Applicant: Samsung Electronics Co., Ltd., Suwon-si (KR)

(72) Inventor: Seung Yun Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/706,554

(22) Filed: Dec. 6, 2012

(65) Prior Publication Data

US 2013/0093841 A1  Apr. 18, 2013

Related U.S. Application Data

(63) Continuation of application No. 13/474,943, filed on May 18, 2012.

(30) Foreign Application Priority Data

May 25, 2011  (KR) .......................... 10-2011-0049474

(51) Int. Cl.
*H04N 7/00* (2011.01)
(52) U.S. Cl.
USPC .......................................................... 348/36
(58) Field of Classification Search
USPC .......................................................... 348/36
See application file for complete search history.

(56) References Cited

U.S. PATENT DOCUMENTS

| 2001/0048465 A1* | 12/2001 | Toyofuku et al. ............... 348/36 |
| 2007/0025723 A1* | 2/2007 | Baudisch et al. ............. 396/287 |
| 2007/0253698 A1* | 11/2007 | Park et al. ..................... 396/296 |
| 2009/0284582 A1* | 11/2009 | Mei et al. ......................... 348/36 |
| 2011/0012989 A1* | 1/2011 | Tseng et al. .................... 348/36 |
| 2011/0074819 A1* | 3/2011 | Yamaji .......................... 345/634 |

FOREIGN PATENT DOCUMENTS

KR    10-2006-0059302 A    6/2006

* cited by examiner

*Primary Examiner* — Anner Holder
(74) *Attorney, Agent, or Firm* — Drinker Biddle & Reath LLP

(57) ABSTRACT

An image photographing device displays a preview panoramic image and data regarding moving velocity and direction of the image photographing device during panorama photographing in real time. The image photographing device includes a photographing unit to photograph a plurality of images, an image processing unit to convert the images photographed by the photographing unit into preview image data and to generate preview panorama data using the preview image data, and a display unit to simultaneously output a screen to display the preview image data, a screen to display a process of synthesizing the preview panorama data, a moving direction display screen indicating a relative difference between the moving direction of the image photographing device and a predetermined reference direction, and a moving velocity display screen indicating a relative difference between the moving velocity of the image photographing device and a predetermined reference velocity.

23 Claims, 18 Drawing Sheets

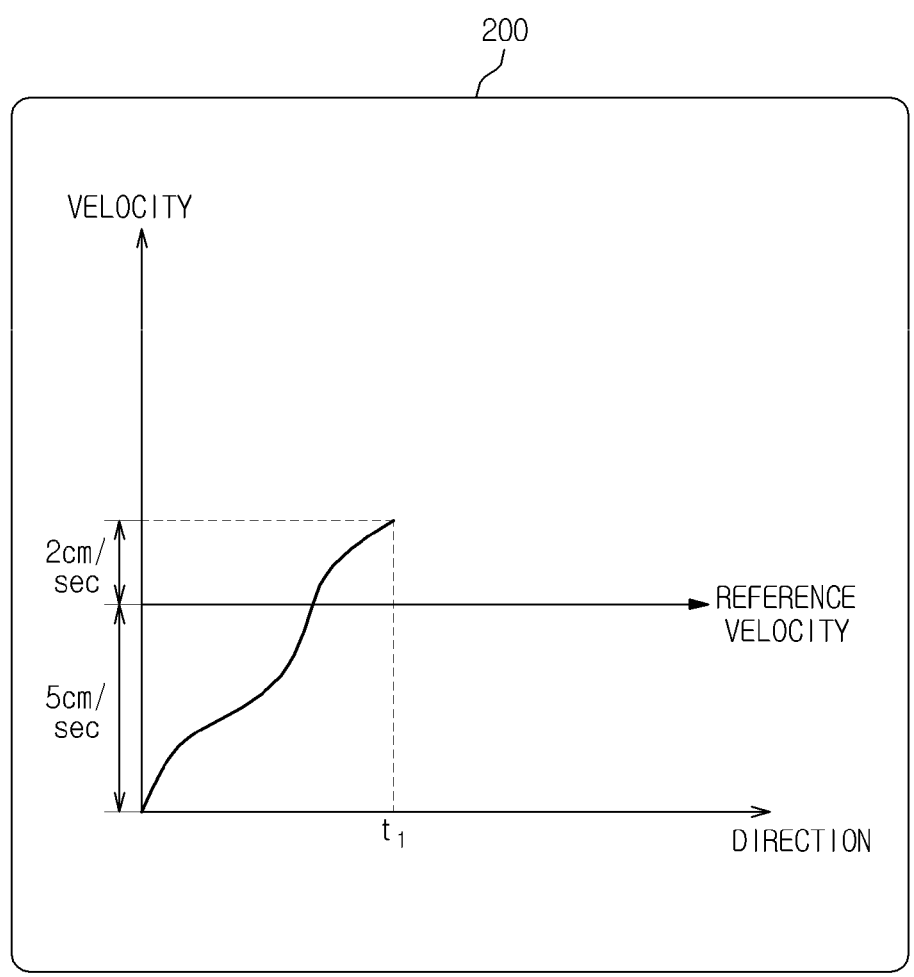

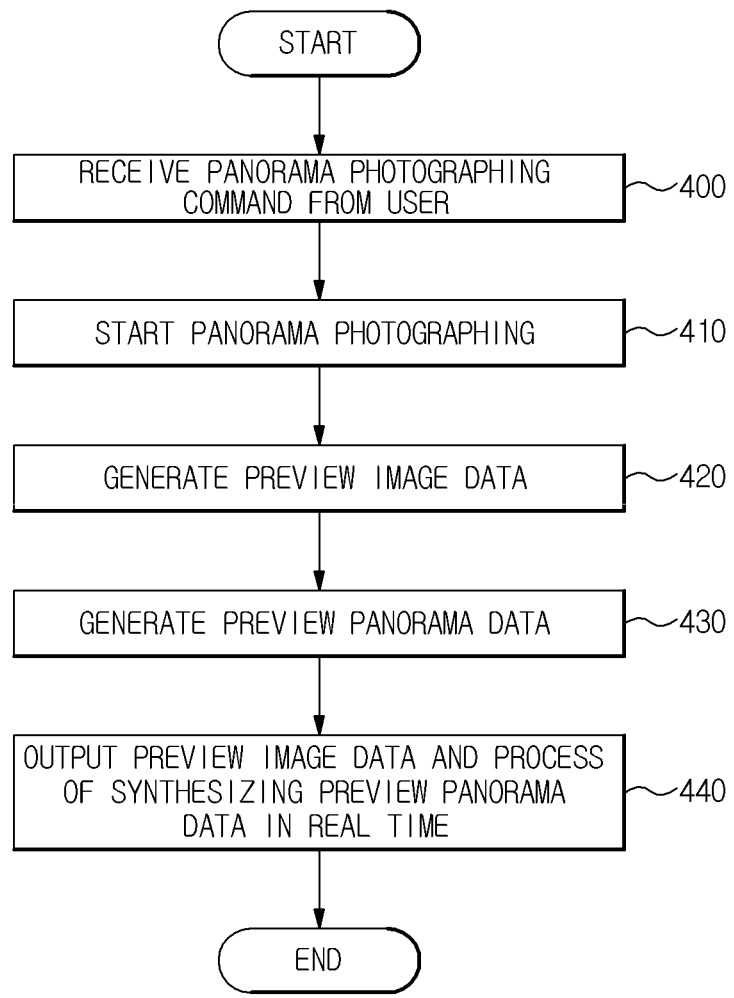

IMAGE PHOTOGRAPHING DEVICE AND CONTROL METHOD THEREOF

CROSS-REFERENCE TO RELATED APPLICATION

This application is a continuation of U.S. patent application Ser. No. 13/474,943, filed May 18, 2012, which claims the priority benefit of Korean Patent Application No. 2011-0049474, filed on May 25, 2011 in the Korean Intellectual Property Office, the disclosure of both being incorporated herein by reference.

BACKGROUND

Embodiments relate to an image photographing device which provides a user interface to generate a panoramic image, and a control method thereof.

In general, an image photographing device includes a photographing unit to obtain an image. The photographing unit obtains an image formed at a focal length of a lens. The image formed at the focal length of the lens has a narrower viewing angle range than a viewing angle of a human. In order to solve such a problem, a panorama photographing method is proposed. The panorama photographing method is divided into a plurality of types. For example, there is a panoramic image generation type in which a plurality of images is photographed while changing an angle of the photographing unit and then the plurality of images are joined in order to reconstruct one panoramic image.

The image photographing device photographs a plurality of images so as to be joined in the horizontal or vertical direction in a panorama photographing mode and then stores the images in a memory. An image processing unit provided in the image photographing device receives the images stored in the memory. The image processing unit joins the plurality of images into one image. The image processing unit may correct chrominance or image deviation generated at an interface between the images. The image processing unit performs image processing operations, such as aligning, stitching and blending, thus correcting chrominance or image deviation between the plurality of images.

Since the panorama photographing method is complicated in operation and may require skillfulness compared to a single photographing mode, measures to improve the operation of the panorama photographing method and to effectively carry out the panorama photographing method may be needed.

SUMMARY

Embodiments include an image photographing device which outputs a preview panoramic image so as to allow a user to preview a panoramic image during panorama photographing, and a control method thereof.

Embodiments also include an image photographing device which displays data regarding moving velocity and direction of the image photographing device during panorama photographing so as to allow a user to easily operate the image photographing device, and a control method thereof.

Additional aspects will be set forth in part in the description which follows and, in part, will be apparent from the description, or may be learned by practice.

In accordance with one embodiment, an image photographing device, which performs panorama photographing by photographing a plurality of images and then combining the plurality of images into a single panoramic image, includes a photographing unit configured to photograph the plurality of images, an image processing unit configured to generate preview image data from the plurality of images photographed by the photographing unit and to generate preview panorama data using the preview image data, and a display unit configured to simultaneously output a screen to display both the preview image data and a screen to display a process of synthesizing the preview panorama data.

The image processing unit may generate the preview panorama data by downsizing the preview image data and mapping the downsized preview image data.

The image photographing device may further include a detection unit configured to detect a motion vector including data regarding moving direction and velocity of the image photographing device during panorama photographing.

The image processing unit may generate a moving direction display screen indicating a relative difference between the moving direction of the image photographing device and a predetermined reference direction and a moving velocity display screen indicating a relative difference between the moving velocity of the image photographing device and a predetermined reference velocity, and then output the moving direction display screen and the moving velocity display screen through the display unit.

The image photographing device may further include a control unit configured to stop panorama photographing when the moving direction of the image photographing device differs from the reference direction by at least a predetermined angle or when the moving velocity of the image photographing device differs from the reference velocity by at least a predetermined extent.

The control unit may control the image processing unit so that abnormal performance of synthesis of the preview panorama data is displayed when the moving direction of the image photographing device does not differ from the reference direction by at least the predetermined angle but the image photographing device moves in a direction in which the synthesis of the preview panorama data is not normally performed.

The control unit may control the image processing unit so that abnormal performance of synthesis of the preview panorama data is displayed when the moving velocity of the image photographing device does not differ from the reference velocity by at least the predetermined extent but the image photographing device moves at a velocity at which the synthesis of the preview panorama data is not normally performed.

Photographing modes of the image photographing device may include a general photographing mode and a panorama photographing mode, and the image photographing device may further include an input unit including a mode set key configured to select one of the general photographing mode and the panorama photographing mode.

In accordance with another aspect, a control method of an image photographing device, which performs panorama photographing by photographing a plurality of images and then combining the plurality of images into a single panoramic image, includes photographing the plurality of images, converting the plurality of images into preview image data and generating preview panorama data using the preview image data, and simultaneously outputting a screen to display both the preview image data and a screen to display a process of synthesizing the preview panorama data.

The generation of the preview panorama data using the preview image data may include generating the preview panorama data by downsizing the preview image data and mapping the downsized preview image data.

The control method may further include calculating a motion vector including data regarding moving direction and velocity of the image photographing device during panorama photographing.

The control method may further include displaying a moving direction display screen indicating a relative difference between the moving direction of the image photographing device and a predetermined reference direction.

Panorama photographing may be stopped when the moving direction of the image photographing device differs from the reference direction by at least a predetermined angle.

Abnormal performance of synthesis of the preview panorama data may be displayed when the moving direction of the image photographing device does not differ from the reference direction by at least the predetermined angle but the image photographing device moves in a direction in which the synthesis of the preview panorama data is not normally performed.

The control method may further include displaying a moving velocity display screen indicating a relative difference between the moving velocity of the image photographing device and a predetermined reference velocity.

Panorama photographing may be stopped when the moving velocity of the image photographing device differs from the reference velocity by at least a predetermined extent.

Abnormal performance of synthesis of the preview panorama data may be displayed when the moving velocity of the image photographing device does not differ from the reference velocity by at least the predetermined extent but the image photographing device moves at a velocity at which the synthesis of the preview panorama data is not normally performed.

BRIEF DESCRIPTION OF THE DRAWINGS

These and/or other aspects will become apparent and more readily appreciated from the following description of the embodiments, taken in conjunction with the accompanying drawings of which:

FIGS. 7B and 7C are views respectively illustrating velocity display screens of the image photographing device shown in FIG. 7A according to movement;

FIG. 9 is a flowchart illustrating a preview panorama photographing method of the image photographing device in accordance with the embodiment.

DETAILED DESCRIPTION

Figure 1:
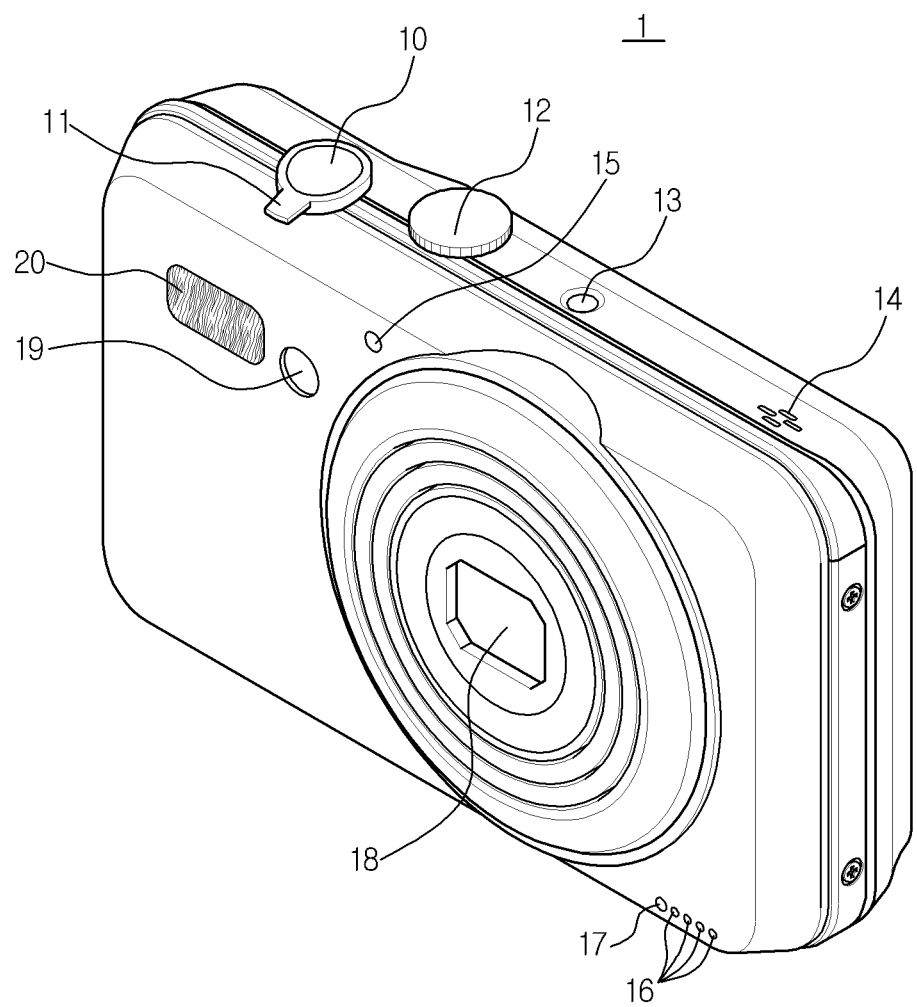
FIG. 1 is a perspective view of an image photographing device in accordance with one embodiment.

Reference will now be made in detail to the embodiments, examples of which are illustrated in the accompanying drawings, wherein like reference numerals refer to like elements throughout.

Figure 2:
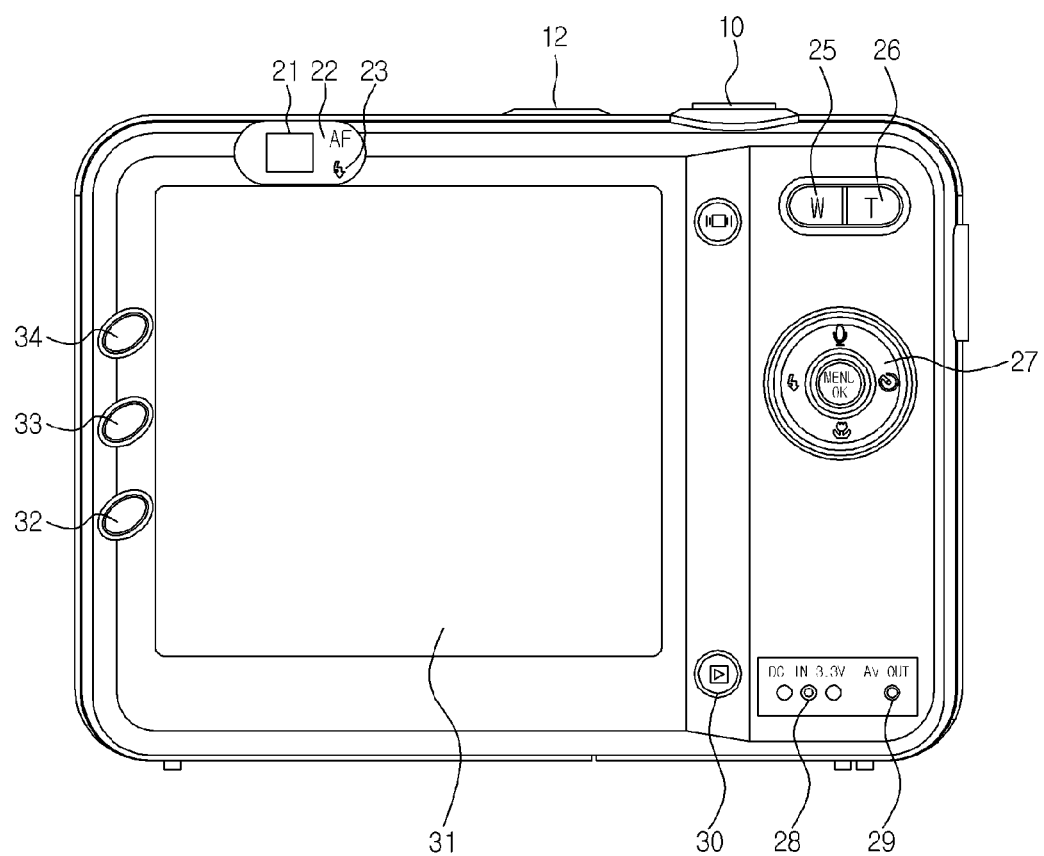
FIG. 2 is a rear view of the image photographing device of FIG. 1.

FIG. 1 is a perspective view of an image photographing device in accordance with one embodiment, and FIG. 2 is a rear view of the image photographing device of FIG. 1.

With reference to FIG. 1, an image photographing device 1 in accordance with the embodiment includes a shutter button 10 to operate the image photographing device, a jog dial 11 to adjust settings of a menu, a mode dial 12 to set a photographing mode, a power switch 13 to turn power on/off, a speaker 14 to output sound, an auto-focus (AF) sub-light source 15 to emit light if auto-focus is performed, a remote controller receiving unit 17 to receive a signal from a remote controller, a microphone 16 to which sound is input, a lens 18 to photograph a subject for photography, and a viewfinder lens 19 provided to check an image photographed by the image photographing device 1 in advance, and a flash 20 to emit light.

With reference to FIG. 2, the image photographing device 1 includes a viewfinder 21 to check an image photographed by the image photographing device 1 in advance, an auto-focus lamp 22 to represent auto-focus and a flash state lamp 23 to represent a flash state, an LCD button 24 to turn an LCD on and off, a wide angle zoom button 25 to support a wide angle zoom function, a telephoto zoom button 26 to support a telephoto zoom function, function buttons 27 to set and cancel various functions, a DC input terminal 28, an external output terminal 29, a reproduction mode button 30, an LCD monitor 31, a manual focus button 32, an auto-exposure lock button 33, and a photographed image quality adjust button 34.

The LCD monitor 31 may be an on screen display (OSD) to represent the current photographing mode and state of the image photographing device 1, and hereinafter will be referred to as "screen 31".

Figure 3:
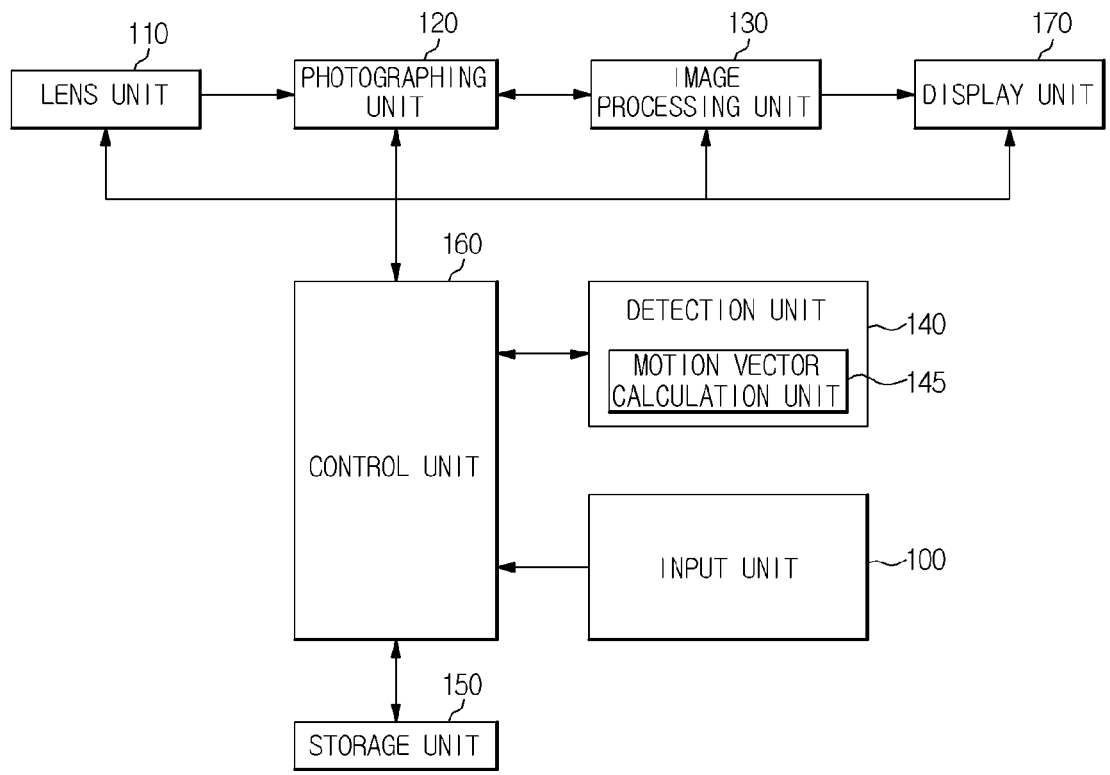
FIG. 3 is a block diagram illustrating a control system of the image photographing device in accordance with the embodiment.

FIG. 3 is a block diagram illustrating a control system of the image photographing device in accordance with the embodiment.

The image photographing device 1 includes an input unit 100, a lens unit 110, a photographing unit 120, an image processing unit 130, a detection unit 140, a storage unit 150, a control unit 160, and a display unit 170.

The input unit 100 includes various function keys shown in FIGS. 1 and 2. The input unit 100 may include the mode dial 12 to set the photographing mode of the image photographing device 1. Here, the modes may include a general photographing mode and a panorama photographing mode. The input unit 100 outputs a key input signal corresponding to a key, received from a user, to the control unit 160.

The photographing unit 120 includes the lens unit 110 which is projectable and retractable. The photographing unit 120 may photograph image data through the lent unit 110. The photographing unit 120 may include a camera sensor (not shown) which converts an optical signal, obtained by photographing, into an electrical signal and a signal processing unit (not shown) which converts the analog signal, obtained by the camera sensor (not shown), into a digital signal.

The detection unit 140 includes a motion vector calculation unit 145. The motion vector calculation unit 145 compares a current input image to a previous input image and detects a motion vector of movement of the image photographing device 1 from a part where chrominance (differences of RGB values) between the two images occurs. For example, the detection unit 140 respectively divides the detected two continuous input images into blocks including a plurality of pixels, and detects a motion vector by comparing RGB values of the pixels in the blocks at the same position of the two images to each other and calculating differences of color numbers. However, various methods may be used to calculate the motion vector and this embodiment is not limited to a specific method.

The detection unit 140 may include an illumination sensor to measure illumination and a distance sensor to measure a focal length with a subject for photography.

The image processing unit 130 converts raw image data for each frame, received from the photographing unit 120, into RGB or YUV data, images of which may be processed, and performs operations for image processing, such as auto-exposure, white balance, auto-focus, and noise removal. The image processing unit 130 compresses the image data output from the photographing unit 120 using a method set according to characteristics and size of the display unit 170, or restores the compressed data to the original image data. The image processing unit 130 may have an on screen display (OSD) function, and the image processing unit 130 may output preview image data according to the size of a screen to be displayed.

The image processing unit 130 generates preview image data and then temporarily stores the generated preview image data in the storage unit 150, in the panorama photographing mode. The image processing unit 130 resizes the preview image data temporarily stored in the storage unit 150. For example, the image processing unit 130 may downsize the preview image data from a size of 2040*1280 to a size of 320*240. The image processing unit 130 generates preview panorama data by checking regions of the resized preview image data overlapped with each other and mapping the respective preview image data.

The image processing unit 130 transmits a screen on which the preview image data are displayed and a screen on which the preview panorama data are displayed so that the two screens are simultaneously output through the display unit 170, in the panorama photographing mode. The image processing unit 130 updates the screen on which the preview image data are displayed and the screen on which the preview panorama data are displayed in real time. The image processing unit 130 outputs an image in which the preview panorama data are synthesized using the preview image data obtained during movement of the image photographing device 1 (for example, an image in which stitching is in progress) in real time. The image in which stitching is in process is an image which is being completed by mapping the plural preview image data.

Here, displaying of the preview image data is displaying of live images photographed in real time on a screen, and displaying of the preview panorama data is displaying of an image used for stitching during generation of a panoramic image in real time.

The image processing unit 130 outputs screens on which moving direction and velocity of the image photographing device 1 are respectively displayed through the display unit 170 according to the motion vector transmitted from the detection unit 140, when the photographing unit 120 of the image photographing device 1 is moved manually or automatically in the panorama photographing mode.

The storage unit 150 includes a program memory and a data memory. The storage unit 150 may store various data necessary to control operation of the image photographing device 1 and data selected by a user. The data memory stores photographed image data, and the program memory stores a program to control the lens unit 110. The storage unit 150 may store data corresponding to a zoom stage according to a distance between the subject for photography and the image photographing device 1. The storage unit 150 may store the preview image data output from the image processing unit 130 and the preview panorama data generated through combination of the preview image data.

The control unit 160 generally controls operation of the respective units. The control unit 160 receives an external signal through the photographing unit 120, processes the external signal, and outputs image output signals necessary to perform various operations, including the photographed image, through the display unit 170.

The control unit 160 switches from the photographing mode of the image photographing device 1 to the panorama photographing mode, when a user selects the panorama photographing mode through the input unit 100. In the panorama photographing mode, a plurality of images are photographed while changing the angle of the photographing unit 120 and the plurality of images are joined to reconstruct one panoramic image. Here, the plurality of images may be photographed in continuous moving image types.

The control unit 160 controls the image processing unit 130 according to data regarding the motion vector transmitted from the detection unit 140, thus adjusting the velocity display screen and the direction display screen output from the display unit 170.

The control unit 160 extracts velocity data from the data regarding the motion vector transmitted from the detection unit 140, completes operation of the image photographing device 1 in the panorama photographing mode, when the moving velocity of the image photographing device 1 is greater than a reference velocity by a predetermined extent or more, and then stops output of the preview panoramic image. The reference velocity is the optimum velocity for normal photography during photographing in the panorama photographing mode, and is set by a designer.

On the other hand, when the moving velocity of the photographing unit 120 does not allow normal performance of the panoramic image synthesis but is not greater than the reference velocity by the predetermined extent or more during photographing in the panorama photographing mode, a preview panoramic image in which stitching is not normally performed is output through the display unit 170. The user confirms that the preview panoramic image is not normal, and then lowers the moving velocity.

The control unit 160 extracts moving direction data from the data regarding the motion vector output from the detection unit 140, and completes operation of the image photographing device 1 in the panorama photographing mode, when the moving direction deviates from a reference direction by a predetermined angle or more, and then stops output of the preview panoramic image through the display unit 170. Here, the reference direction is the optimum direction to be moved for panorama photographing. The reference direction is set by a designer, and is designed so as to be varied according to panoramic image generation types. For example, there are a planar panoramic image generation type and a cylindrical panoramic image generation type. The optimum moving directions of the image photographing device 1 corresponding to various panorama generation types are considered during design, and the optimum moving direction may be set to the reference direction. Here, setting of the reference direction does not mean setting of the absolute direction, but means setting of the reference direction corresponding to the panoramic image generation type. For example, in the case of the planar panorama generation type, the initial moving direction may be set to the reference direction. Hereinafter, the planar panoramic image generation type will be exemplarily described for clear description of the embodiment. However, the embodiment is not limited to the planar panoramic image generation type.

The display unit 170 may simultaneously display both the screen on which the preview image data are displayed and the screen on which the preview panorama data are displayed during panorama photographing.

FIGS. 4A, 4B, 4C, 4D, and 4E are views illustrating preview image data and preview panorama data displayed through the display unit of the image photographing device 1 in accordance with the embodiment in order of photographing time.

Hereinafter, from among the planar panoramic image generation type, a scheme in which multiple scenes are arranged in a line in the horizontal direction will be exemplarily described.

When a user selects the panorama photographing mode through the input unit 100, the control unit 160 switches from the current photographing mode of the image photographing device 1 to the panorama photographing mode. When the current photographing mode of the image photographing device 1 is switched to the panorama photographing mode, the control unit 160 causes a moving picture input through the photographing unit 120 to be converted into a panoramic image by the image processing unit 130 and then outputs the panoramic image through the display unit 170.

The image photographing device 1 photographs the moving picture to generate panorama data according to manual movement by the user in the panorama photographing mode. The photographing unit 120 transmits the photographed moving picture for each frame to the image processing unit 130, and the image processing unit 130 converts the received image data for each frame into data, images of which may be processed, and outputs preview image data according to the size of a displayed screen.

The preview image data output from the image processing unit 130 are output as a live view through the display unit 170, and are transmitted to and stored in the storage unit 150. The image processing unit 130 resizes (precisely, downsizes) the preview image data stored in the storage unit 150. The image processing unit 130 generates preview panorama data by checking regions of the resized preview image data overlapped with each other and mapping the respective preview image data. The image processing unit 130 outputs partial images, which are stitched, during generation of the preview panorama data in real time through the display unit 170.

Figure 4A:
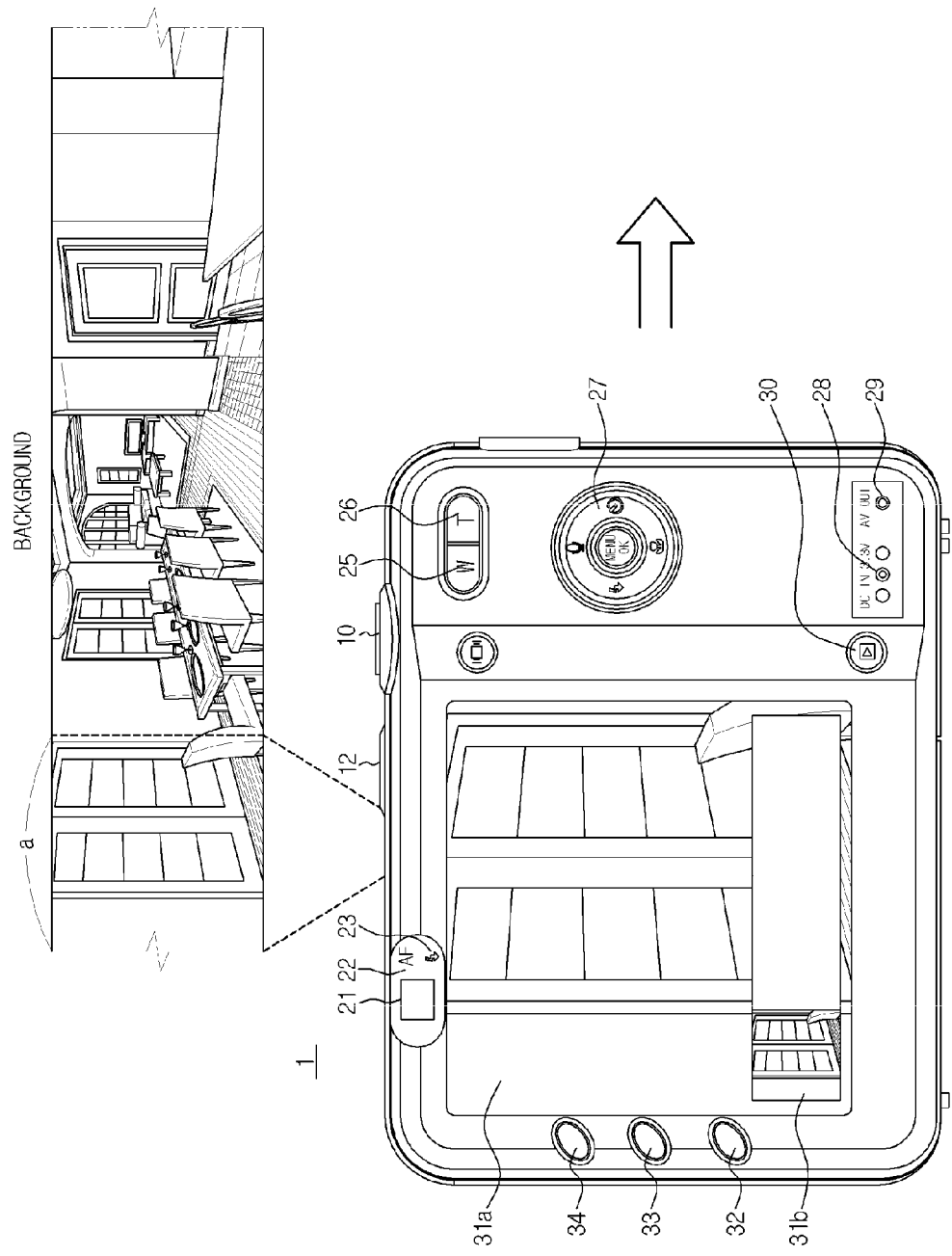
FIGS. 4A, 4B, 4C, 4D, and 4E are views illustrating preview image data and preview panorama data displayed through a display unit of the image photographing device in accordance with the embodiment in order of photographing time.
Figure 4B:
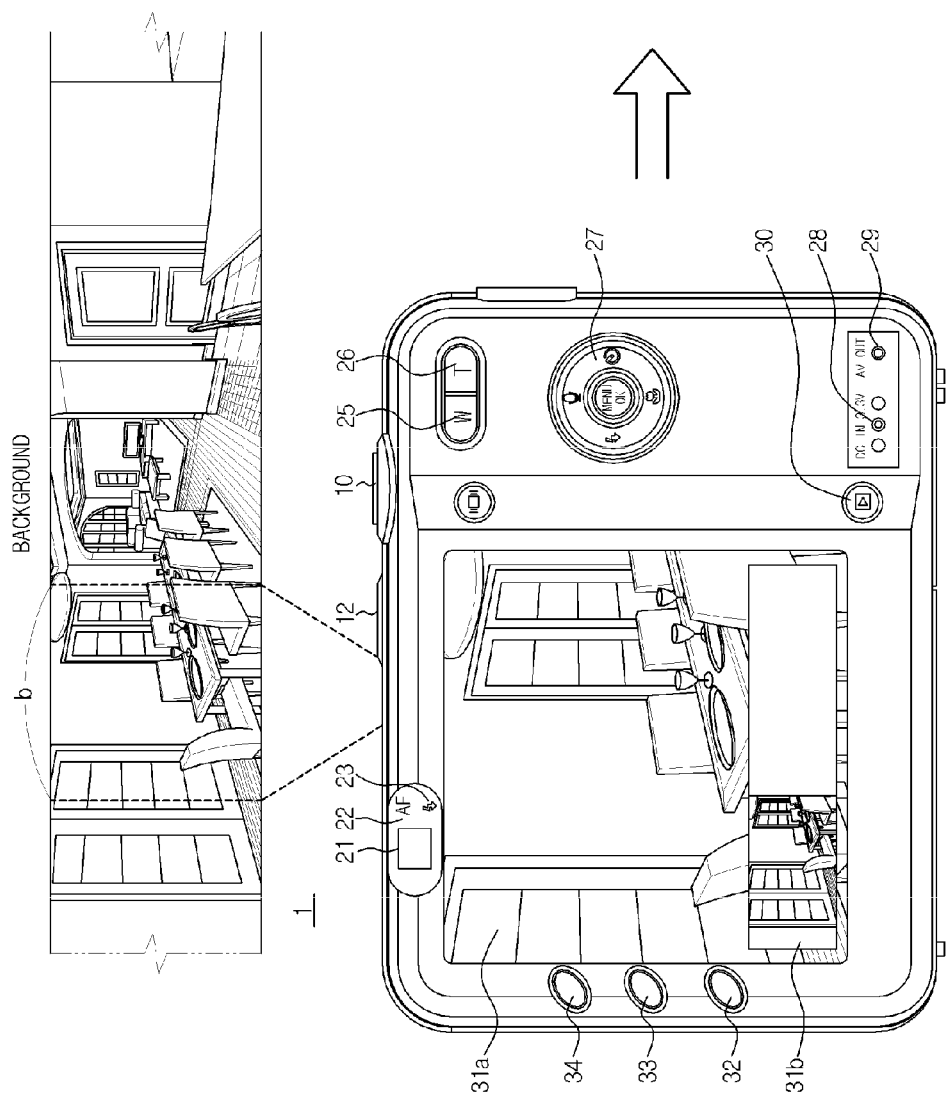
Figure 4C:
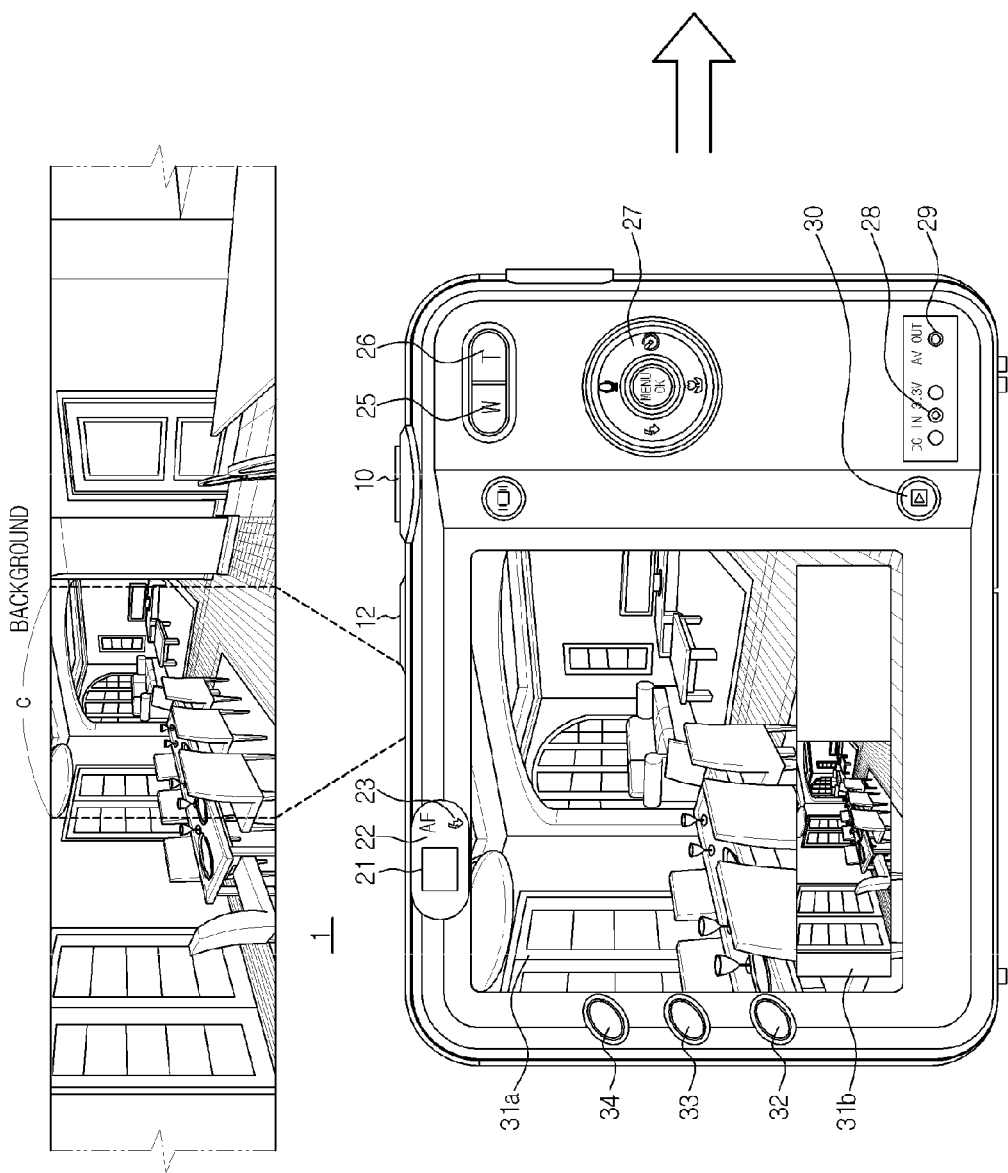
Figure 4D:
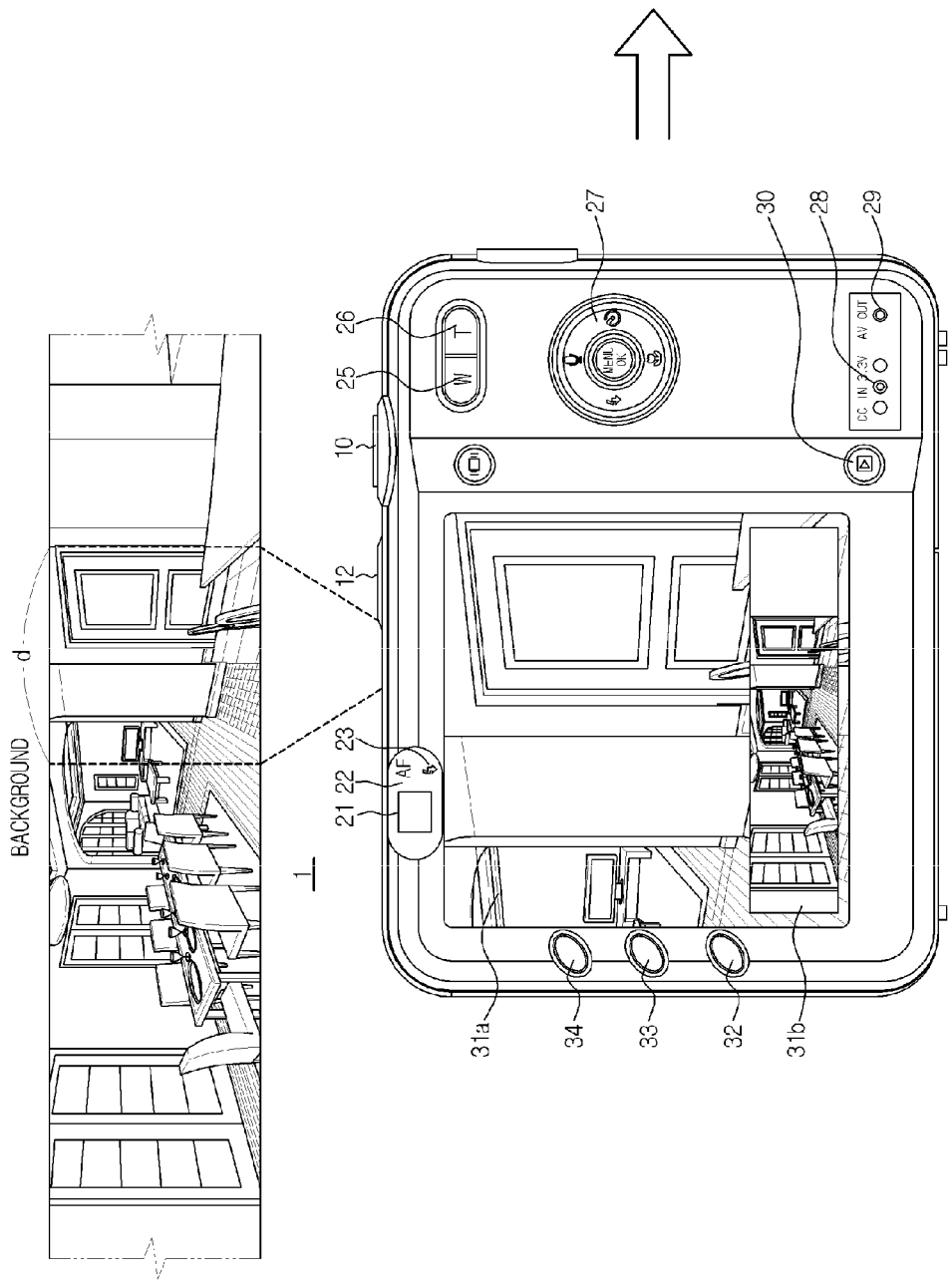
Figure 4E:
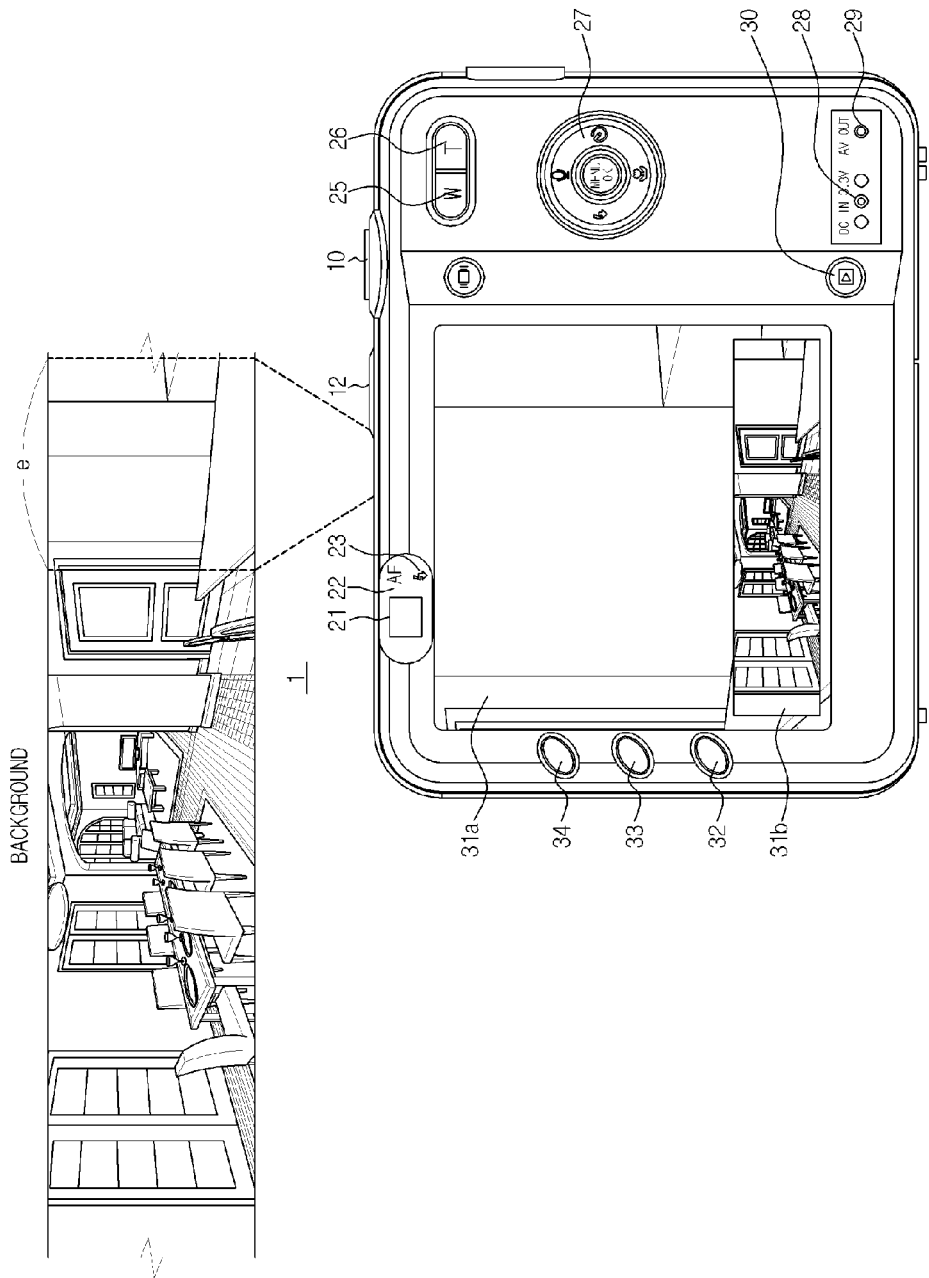

FIG. 4A is a view illustrating the screen which starts to output the preview image data and the preview panorama data, generated by the image processing unit 130, through the display unit 170, and FIGS. 4B to 4E are views illustrating a process of stitching the preview panorama data when the image photographing device 1 moves in the horizontal direction after the state of FIG. 4A. With reference to FIG. 4A, a region 'a' is photographed, obtained preview image data are displayed as a live view, and preview panorama data of the region 'a' are displayed on a screen 31b. With reference to FIG. 4B, the image photographing device 1 moves from the position shown in FIG. 4A in the horizontal direction and thus a region 'b' is displayed as a live view on a screen 31a, and a scene in which newly obtained preview panorama data of the region 'b' are stitched to the previously obtained preview panorama data of the region 'a' is displayed on the screen 31b. FIGS. 4C to 4E illustrate display of preview image data of regions 'c' to 'e' on the screen 31a and processes of stitching preview panorama data of the regions 'c' to 'e' on the screen 31b, simultaneously.

As shown in FIGS. 4A to 4E, the screen output through the display unit 170 is divided into the screen 31a displaying the preview image data and the screen 31b displaying progress of stitching of the preview panorama data, thus simultaneously displaying the screen 31a and the screen 31b.

Figure 5:
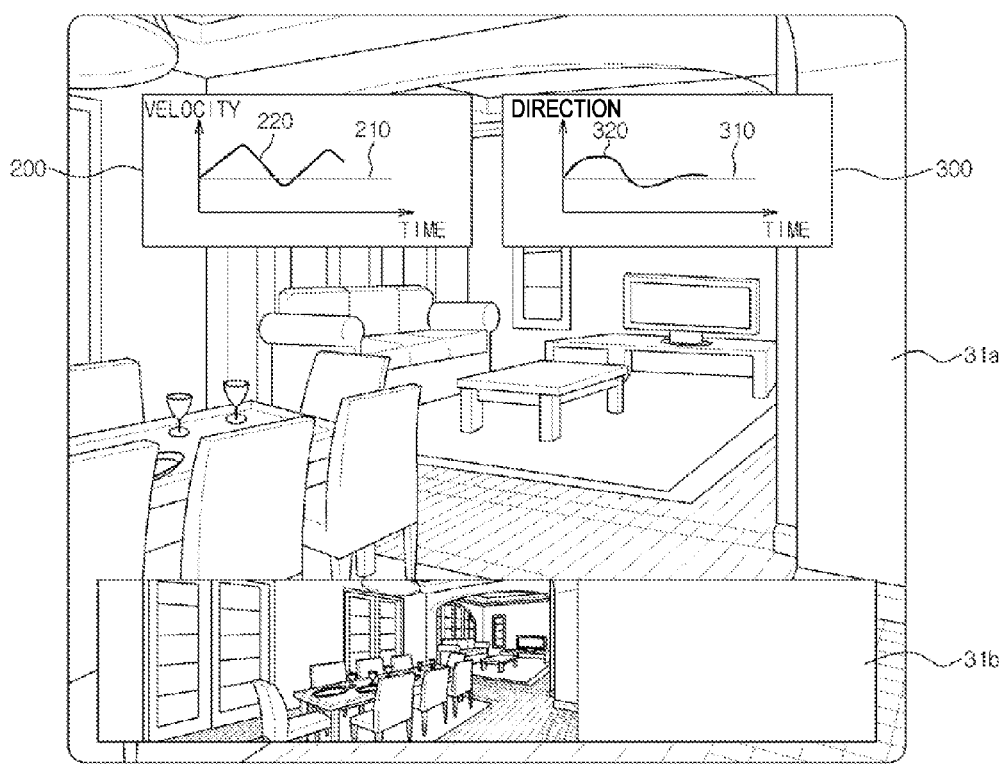
FIG. 5 is a view illustrating screens displaying moving direction and velocity of the image photographing device in accordance with the embodiment.

FIG. 5 is a view illustrating screens displaying moving direction and velocity of the image photographing device in accordance with the embodiment.

The motion vector calculation unit 145 compares an image currently input to the image photographing device 1 to a previously input image, and detects a motion vector of movement of the image photographing device 1 from a part where chrominance between the two images occurs. The motion vector includes data regarding the moving direction and the moving velocity of the image photographing device 1.

The image photographing device 1 may display a predetermined reference velocity and a current moving velocity relative to the reference velocity through a velocity display screen 200, during panorama photographing. With reference to FIG. 5, reference numeral 210 indicates a curve of the reference velocity and reference numeral 220 indicates a curve of the current moving velocity relative to the reference velocity. When the current moving velocity curve 220 is above the reference velocity curve 210 in the velocity display screen 200 of FIG. 5, the current moving velocity is higher than the reference velocity, and when the current moving velocity curve 220 is below the reference velocity curve 210, the current moving velocity is lower than the reference velocity. A user may comparatively easily adjust the moving velocity of the image photographing device 1 with reference to the velocity display screen 200 output through the display unit 170.

The image photographing device 1 may display a predetermined reference direction and a current moving direction relative to the reference direction through a direction display screen 300, during panorama photographing. With reference to FIG. 5, reference numeral 310 indicates a curve of the reference direction and reference numeral 320 indicates a curve of the current moving direction relative to the reference direction. When the current moving direction curve 320 is above the reference direction curve 310 in the direction display screen 300 of FIG. 5, the image photographing device 1 moves upwards from the reference direction, and when the current moving direction curve 320 is below the reference direction curve 310, the image photographing device 1 moves downwards from the reference direction.

Figure 6:
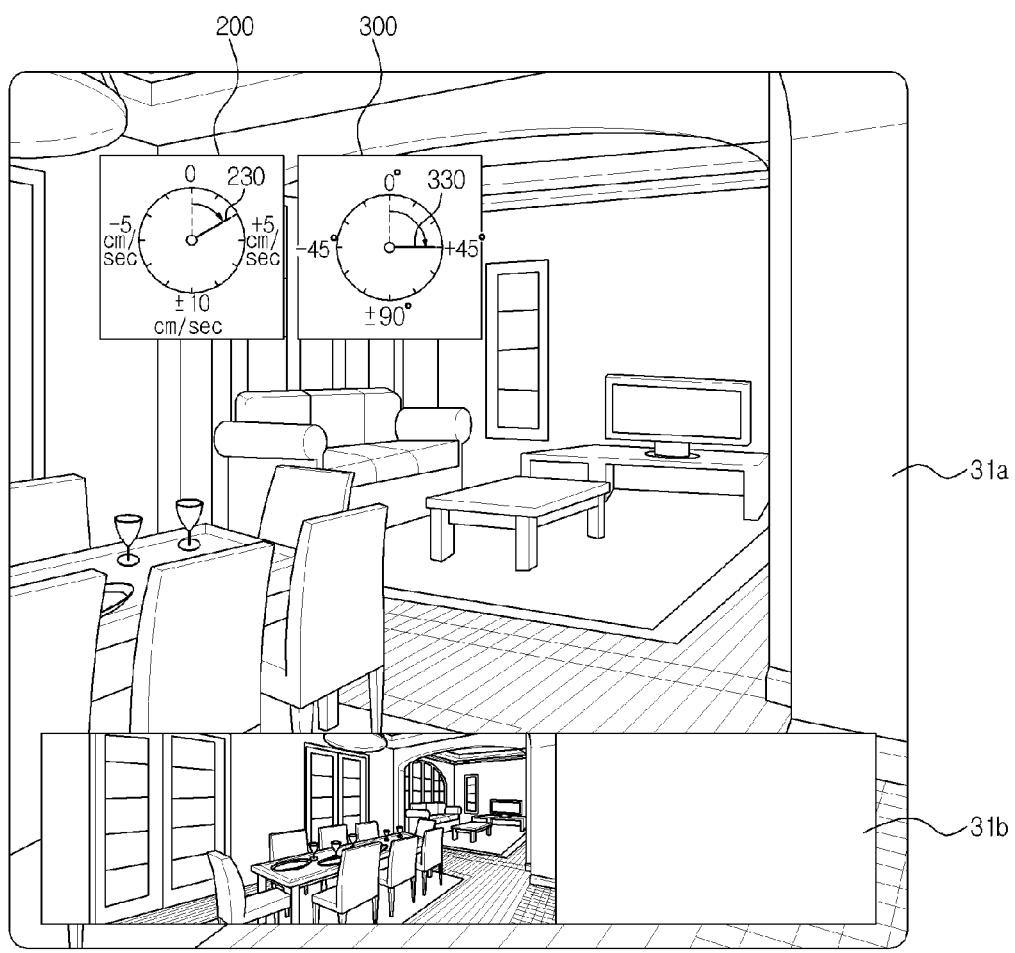
FIG. 6 is a view illustrating screens displaying moving direction and velocity of the image photographing device in a type differing from FIG. 5.

FIG. 6 is a view illustrating screens displaying moving direction and velocity of the image photographing device in a type differing from FIG. 5.

In FIG. 6, the velocity display screen 200 and the direction display screen 300 are displayed in a gauge type.

In the gauge type velocity display screen 200, a velocity indicating gauge may be varied according to design. Here, the velocity indicating gauge may be designed such that the 12 o'clock direction represents a reference velocity, when an indicator 230 moves to the right from the 12 o'clock direction, the current moving velocity is higher than the reference velocity, and when the indicator 230 moves to the left from the 12 o'clock direction, the current moving velocity is lower than the reference velocity. (Here, the velocity indicating gauge may be designed such that, when the indicator turns in the clockwise direction and passes by the 6 o'clock direction or when the indicator turns in the counterclockwise direction and passes by the 6 o'clock direction, panorama photographing is stopped).

In the gauge type direction display screen 300, a direction indicating gauge may be varied according to design. Here, the direction indicating gauge may be designed such that the 12 o'clock direction represents a reference direction, when an indicator 330 moves to the right from the 12 o'clock direction, the image photographing device 1 moves upwards from the reference direction, and when the indicator 230 moves to the left from the 12 o'clock direction, the image photographing device 1 moves downwards from the reference direction.

Although FIGS. 5 and 6 exemplarily illustrate the velocity display screens and the direction display screens, the embodiment is not limited thereto. That is, any screens which display moving velocity and direction of the image photographing device 1 during panorama photographing may be applied to the embodiment.

The image photographing device 1 completes panorama photographing, when the moving direction of the image photographing device 1 deviates from the reference direction by a predetermined angle or more during panorama photographing, and completes panorama photographing, when the moving velocity of the image photographing device 1 differs from the reference velocity by a predetermined extent or more.

Figure 7A:
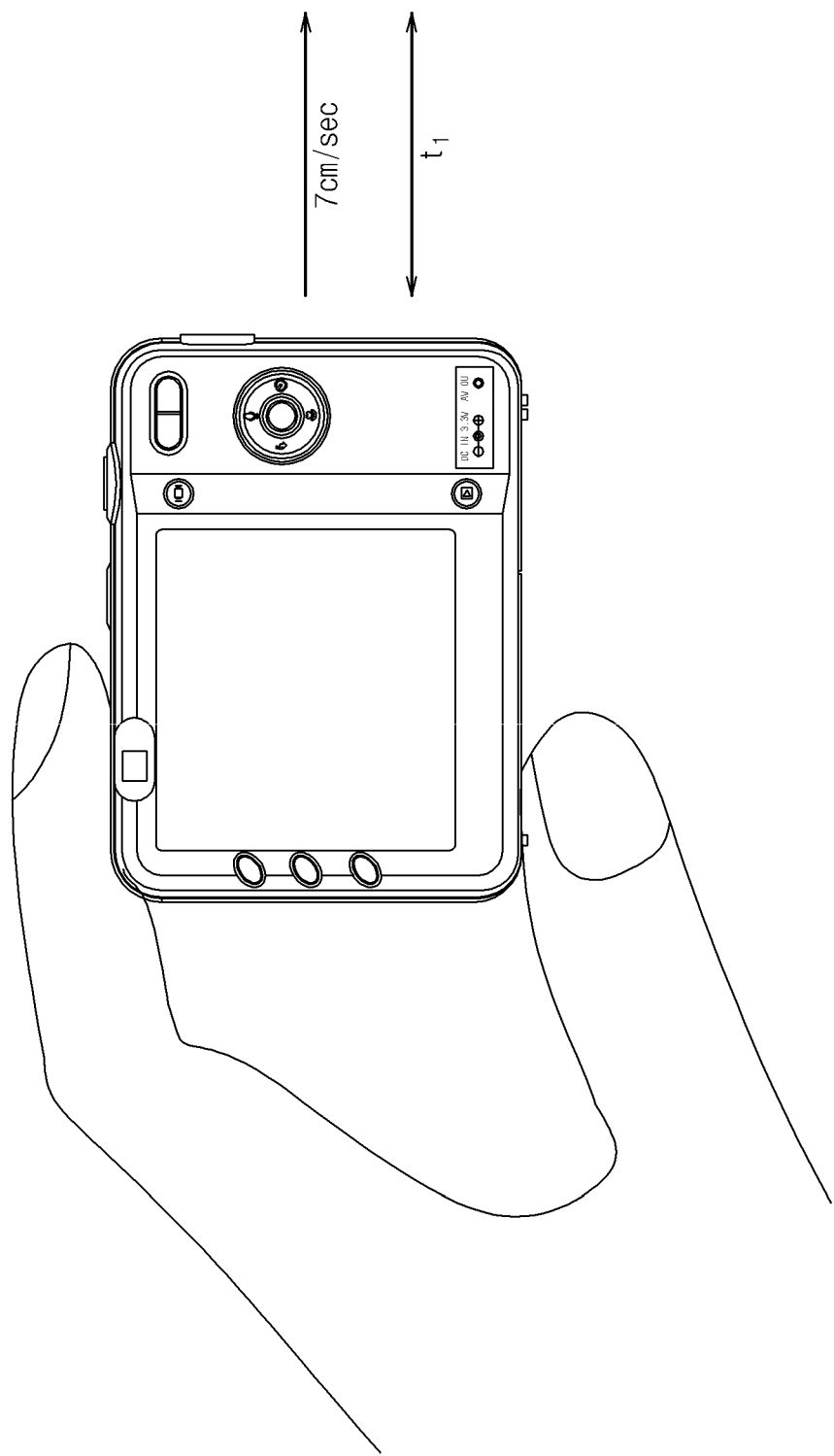
FIG. 7A is a view illustrating a moving velocity of the image photographing device in accordance with the embodiment.
Figure 7C:
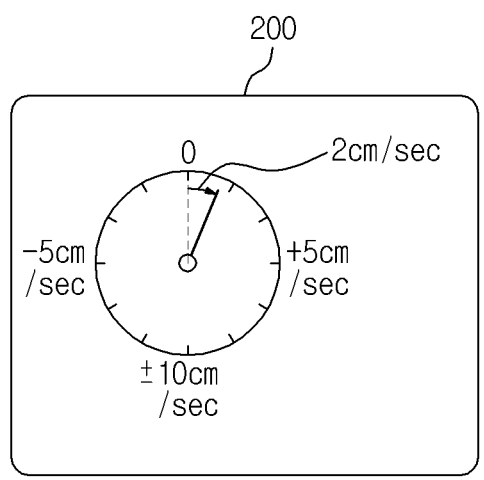

FIG. 7A is a view illustrating a moving velocity of the image photographing device 1 in accordance with the embodiment, and FIGS. 7B and 7C are views respectively illustrating velocity display screens 200 of the image photographing device 1 shown in FIG. 7A according to movement.

With reference to FIG. 7A, the image photographing device 1 moves at a velocity of 7 cm/sec by a user during panorama photographing. Here, if it is assumed that the reference velocity is 5 cm/sec, the current moving velocity of the image photographing device 1 exceeds the reference velocity by +2 cm/sec, and thus FIGS. 7B and 7C illustrate a state in which moving velocity of the image photographing device 1 exceeds the reference velocity by +2 cm/sec.

The image photographing device 1 may be designed such that panorama photographing is stopped when the moving velocity of the image photographing device is more than 100 cm/sec.

Figure 8A:
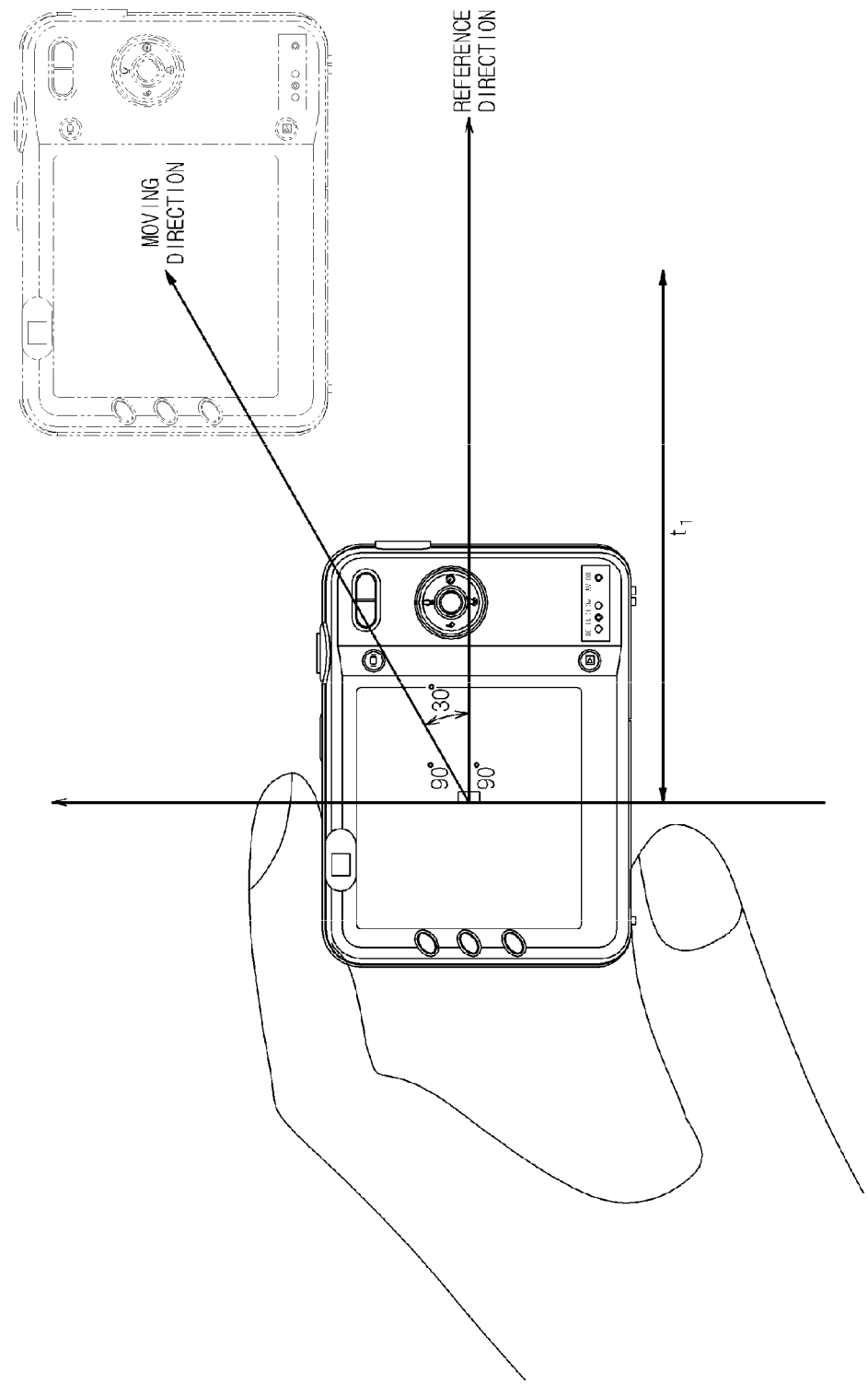
FIG. 8A is a view illustrating a moving direction of the image photographing device in accordance with the embodiment.
Figure 8B:
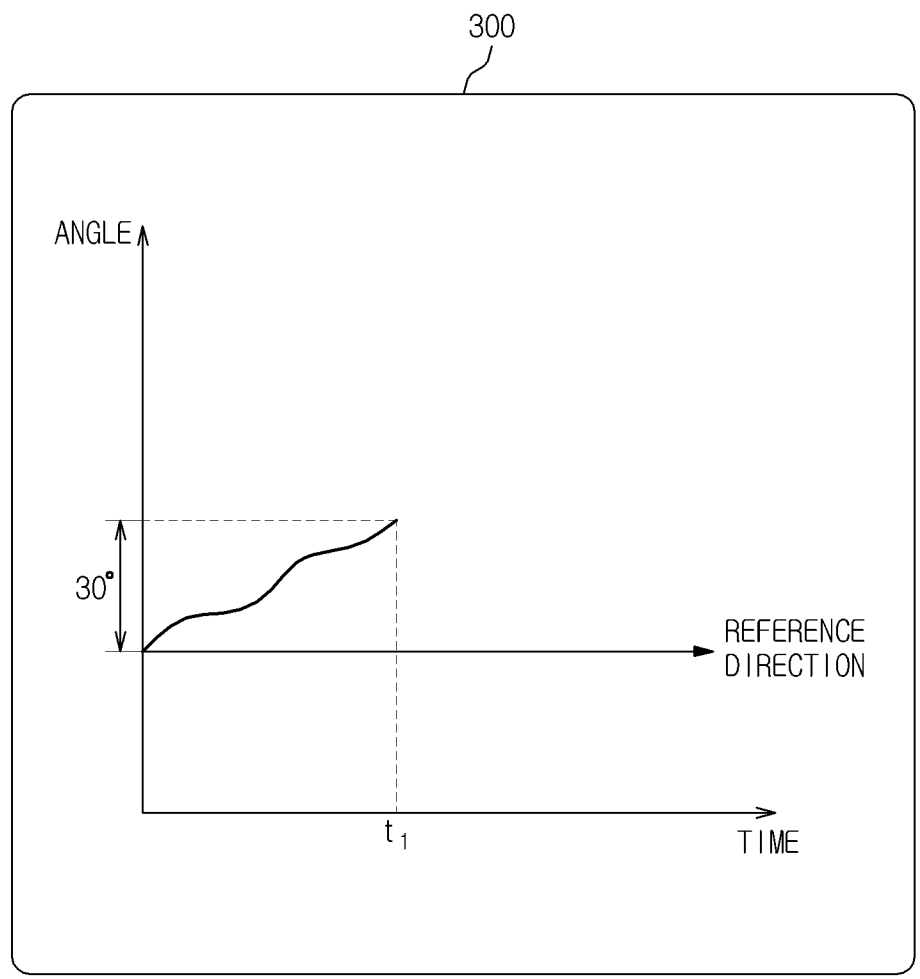
FIGS. 8B and 8C are views respectively illustrating direction display screens of the image photographing device shown in FIG. 8A according to movement.
Figure 8C:
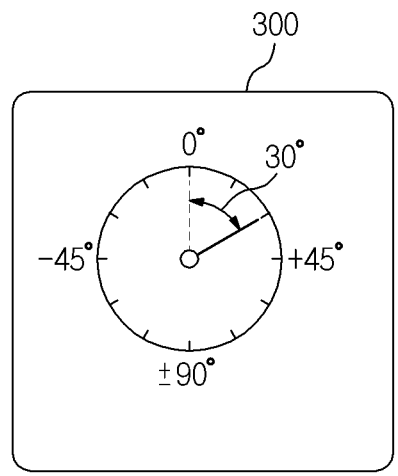

FIG. 8A is a view illustrating a moving direction of the image photographing device 1 in accordance with the embodiment, and FIGS. 8B and 8C are views respectively illustrating direction display screens 300 of the image photographing device 1 shown in FIG. 8A according to movement.

With reference to FIG. 8A, the image photographing device 1 moves in a direction upwards from the reference direction by an angle of +30° during panorama photographing. With reference to FIGS. 8B and 8C, the respective direction display screens 300 illustrate that the moving direction of the image photographing device 1 deviates from the reference direction by an angle of +30°. A user may easily adjust the moving direction of the image photographing device 1 with reference to the direction display screen 300.

With reference to FIG. 8A, the image photographing device 1 may be designed such that panorama photographing is stopped when the moving direction of the image photographing device deviates from the reference direction by an angle of ±90° or more. However, such an angle at which panorama photographing of the image photographing device 1 is stopped (i.e., an angle by which the moving direction of the image photographing device 1 deviates from the reference direction) may be set by a designer or a user.

FIG. 9 is a flowchart illustrating a preview panorama photographing method of the image photographing device 1 in accordance with the embodiment.

When a user selects the panorama photographing mode through the input unit 100, the control unit 160 of the image photographing device 1 switches from the current photographing mode of the image photographing device 1 to the panorama photographing mode. When the current photographing mode of the image photographing device 1 is switched to the panorama photographing mode, the control unit 160 causes a moving picture input through the photographing unit 120 to be converted into a panoramic image by the image processing unit 130 (Operations 400 and 410).

The image processing unit 130 converts raw image data for each frame, received from the photographing unit 120, into RGB or YUV data, images of which may be processed, and performs operations for image processing, such as auto-exposure, white balance, auto-focus, and noise removal. The image processing unit 130 sets the data output from the photographing unit 120 according to characteristics and size of the display unit 170, and outputs preview image data (Operation 420).

The image processing unit 130 generates the preview image data and then temporarily stores the generated preview image data in the storage unit 150. The image processing unit 130 resizes the preview image data temporarily stored in the storage unit 150. The image processing unit 130 generates preview panorama data by checking regions of the resized preview image data overlapped with each other and mapping the respective preview image data (Operation 430).

The image processing unit 130 simultaneously outputs a screen on which the preview image data are displayed and a screen on which the preview panorama data are displayed. That is, the image processing unit 130 outputs a process of synthesizing the preview panorama data using the preview image data obtained during movement of the image photographing device 1 in real time (Operation 440).

Figure 10:
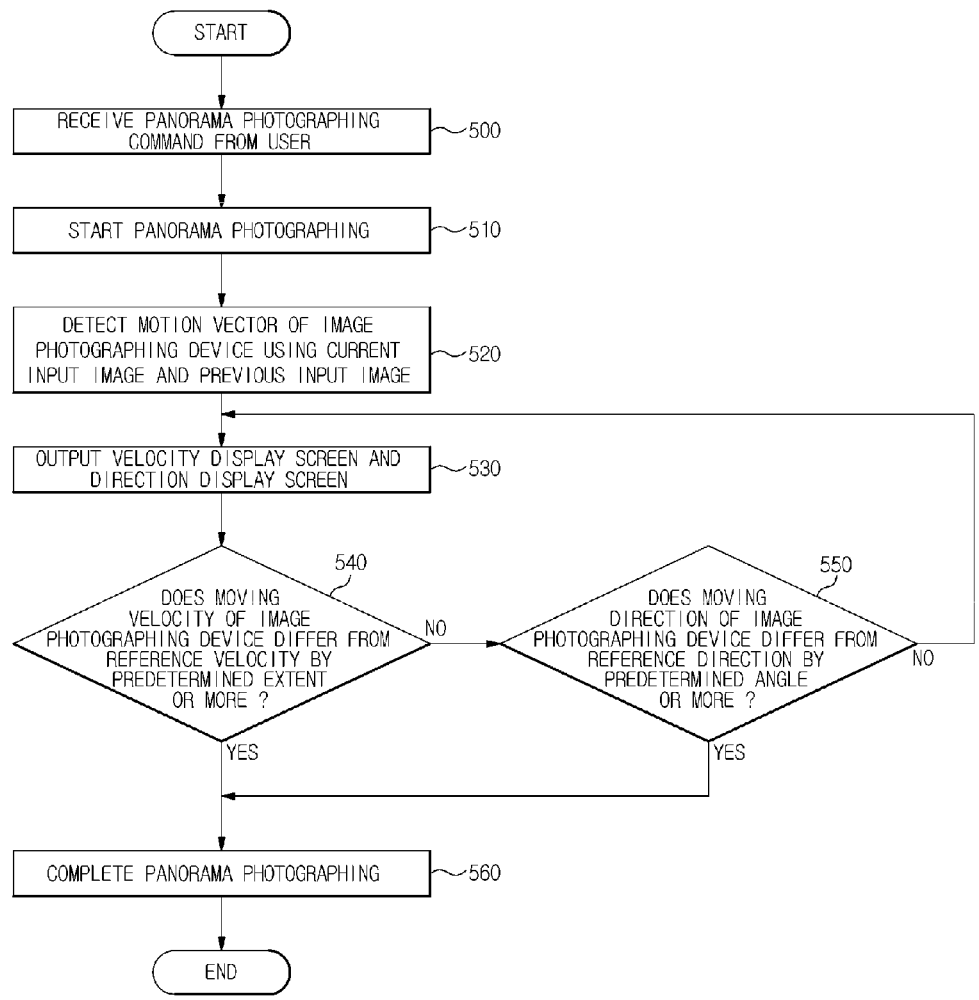
FIG. 10 is a flowchart illustrating a control method of the image photographing device in accordance with the embodiment according to moving direction and velocity, during panorama photographing.

FIG. 10 is a flowchart illustrating a control method of the image photographing device 1 in accordance with the embodiment according to moving direction and velocity, during panorama photographing.

When a user selects the panorama photographing mode through the input unit 100, the control unit 160 of the image photographing device 1 switches from the current photographing mode of the image photographing device 1 to the panorama photographing mode. When the current photographing mode of the image photographing device 1 is switched to the panorama photographing mode, the control unit 160 causes a moving picture input through the photographing unit 120 to be converted into a panoramic image by the image processing unit 130 (Operations 500 and 510).

The motion vector calculation unit 145 of the detection unit 140 compares a current input image to a previous input image and detects a motion vector of movement of the image photographing device 1 from a part where chrominance (differences of RGB values) between the two images occurs (operation 520).

The image processing unit 130 outputs the velocity display screen and the direction display screen through the display unit 170 by combination between data regarding the reference velocity and direction input through the control unit 160 and data regarding the current moving velocity and direction of the image photographing device 1, during panorama photographing (Operation 530).

The control unit 160 confirms the moving velocity of the image photographing device 1, and completes panorama photographing when the moving velocity of the image photographing device 1 differs from the reference velocity by a predetermined extent or more (Operations 540 and 560).

The control unit 160 confirms the moving direction of the image photographing device 1, and completes panorama photographing when the moving direction of the image photographing device 1 differs from the reference direction by a predetermined angle or more (Operations 550 and 560).

The above-describe reference velocity and direction may be values varied according to detailed factors of the panorama photographing mode and be set by a designer or a user. Further, the reference velocity and direction are not limited to designated velocity and direction but may be varied in real time according to the detailed factors of the panorama photographing mode. Here, values displayed on the velocity display screen and the direction display screen indicate relative differences with the reference velocity and direction, and thus the reference velocity and direction may be varied.

As is apparent from the above description, an image photographing device and a control method thereof in accordance with one embodiment may check a preview panoramic image in real time during panorama photographing.

Further, an image photographing device and a control method thereof in accordance with another embodiment may confirm differences between moving velocity and direction of the image photographing device and reference velocity and direction during panorama photographing, thus allowing the image photographing device to be easily operated.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An image photographing device, which is operable in a panorama photographing mode to perform panorama photographing by photographing a plurality of images and combining the plurality of images into a single panoramic image, comprising:
    a photographing unit configured to photograph the plurality of images;
    an image processing unit configured to generate preview live-view image data and to generate preview panorama image data; and
    a display unit operable to display both the preview live-view image data and the preview panorama image data,
    wherein the display unit superimposedly displays, over the preview live-view image data, a reference line representing a reference direction and the preview panorama image data, moving direction related information of the image photographing device is displayed on the display unit together with displaying of the reference line, the preview live-view image data and the preview panorama image data during the panorama photographing mode, and the moving direction related information is displayed to indicate a relative difference between a current detected moving direction of the image photographing device and the reference direction.

2. The image photographing device according to claim 1, wherein the relative difference indicates a vertical deviation of the detected moving direction of the image photographing device from the reference direction.

3. The image photographing device according to claim 2, wherein the vertical deviation indicates up or down movement of the photographing device with respect to the reference direction.

4. The image photographing device according to claim 1, wherein a moving velocity of the image photographing device detected during the panorama photographing mode is graphically indicated on the display unit.

5. The image photographing device according to claim 4, wherein a velocity display section displayed on the display unit is configured to show a relative velocity difference between the detected moving velocity of the image photographing device and a predetermined reference velocity.

6. The image photographing device according to claim 1, wherein the image processing unit generates the preview panorama image data by downsizing the preview live-view image data and combining the downsized preview live-view image data.

7. The image photographing device according to claim 1, further comprising a detection unit configured to detect a motion vector including data regarding moving direction or velocity of the image photographing device during the panorama photographing mode.

8. The image photographing device according to claim 1, further comprising a control unit configured to stop panorama photographing when the detected moving direction of the image photographing device differs from the reference direction by a predetermined angle.

9. The image photographing device according to claim 1, further comprising a control unit configured to stop panorama photographing when a detected moving velocity of the image photographing device differs from a reference velocity by a predetermined extent.

10. The image photographing device according to claim 8, wherein the control unit controls the image processing unit so that abnormal performance of synthesis of the preview panorama image data is displayed when the image photographing device moves in a direction in which the synthesis of the preview panorama image data is not normally performed.

11. The image photographing device according to claim 9, wherein the control unit controls the image processing unit so that abnormal performance of synthesis of the preview panorama image data is displayed when the synthesis of the preview panorama image data is not normally performed.

12. The image photographing device according to claim 1, wherein:
    photographing modes of the image photographing device include a general photographing mode and a panorama photographing mode; and
    the image photographing device further comprises an input unit including a mode set key configured to select one of the general photographing mode and the panorama photographing mode.

13. A method of an image photographing device, which is operable in a panorama photographing mode to perform panorama photographing by photographing a plurality of images and combining the plurality of images into a single panoramic image, the method comprising:
    photographing the plurality of images;
    generating preview live-view image data;
    generating preview panorama image data;
    superimposedly displaying, over the preview live-view image data, a reference line representing a reference direction and the preview panorama image data; and
    displaying moving direction related information of the image photographing device together with displaying of the reference line, the preview live-view image data and the preview panorama image data,
    wherein the moving direction related information is displayed to indicate a relative difference between a current detected moving direction.

14. The method according to claim 13, wherein the relative difference indicates a vertical deviation of the detected moving direction of the image photographing device from the reference direction.

15. The method according to claim 14, wherein the vertical deviation indicates up or down movement of the photographing device with respect to the reference direction.

16. The method according to claim 13, further comprising:
    displaying a moving velocity of the image photographing device together with displaying of the preview live-view image data and the preview panorama image data.

17. The method according to claim 16, wherein a velocity display section displayed on the display unit is configured to show a relative difference between the detected moving velocity of the image photographing device and a predetermined reference velocity.

18. The method according to claim 13, wherein the generation of the preview panorama image data comprises downsizing the preview live-view image data and combining the downsized preview live-view image data.

19. The method according to claim 13, further comprising calculating a motion vector including data regarding moving direction or velocity of the image photographing device during panorama photographing.

20. The method according to claim 13, wherein panorama photographing is stopped when the detected moving direction of the image photographing device differs from the reference direction by a predetermined angle.

21. The method according to claim 20, wherein abnormal performance of synthesis of the preview panorama image data is displayed when the moving direction of the image photographing device does not differ from the reference direction by at least the predetermined angle but the image photographing device moves in a direction in which the synthesis of the preview panorama image data is not normally performed.

22. The method according to claim 13, wherein panorama photographing is stopped when a detected moving velocity of the image photographing device differs from a reference velocity by a predetermined extent.

23. The method according to claim 22, wherein abnormal performance of synthesis of the preview panorama image data is displayed when the moving velocity of the image photographing device does not differ from the reference velocity by at least the predetermined extent but the image photographing device moves at a velocity at which the synthesis of the preview panorama image data is not normally performed.

* * * * *